(12) United States Patent
Panchaksharaiah et al.

(10) Patent No.: US 12,477,180 B2
(45) Date of Patent: *Nov. 18, 2025

(54) METHODS AND SYSTEMS FOR REQUESTING MEDIA CONTENT PLAYBACK

(71) Applicant: Adeia Guides Inc., San Jose, CA (US)

(72) Inventors: Vishwas Sharadanagar Panchaksharaiah, Tiptur (IN); Vikram Makam Gupta, Karnataka (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,409

(22) Filed: Jul. 7, 2023

(65) Prior Publication Data

US 2023/0353825 A1    Nov. 2, 2023

Related U.S. Application Data

(63) Continuation of application No. 17/479,607, filed on Sep. 20, 2021, now Pat. No. 11,736,768.

(51) Int. Cl.
*H04N 21/454* (2011.01)
*H04N 21/45* (2011.01)
*H04N 21/845* (2011.01)

(52) U.S. Cl.
CPC ....... *H04N 21/454* (2013.01); *H04N 21/4532* (2013.01); *H04N 21/8456* (2013.01)

(58) Field of Classification Search
CPC ............. H04N 21/454; H04N 21/4532; H04N 21/8456

USPC ............................................. 725/25
See application file for complete search history.

(56) References Cited

U.S. PATENT DOCUMENTS

| | | | |
|---|---|---|---|
| 6,698,020 B1 | 2/2004 | Zigmond et al. | |
| 8,041,190 B2 | 10/2011 | Candelore et al. | |
| 9,813,641 B2 | 11/2017 | Hendricks et al. | |
| 11,438,675 B1 | 9/2022 | Pressnell et al. | |
| 11,736,768 B2 | 8/2023 | Panchaksharaiah et al. | |
| 2009/0083140 A1 | 3/2009 | Phan | |
| 2012/0240142 A1* | 9/2012 | Rose | H04H 60/74 725/14 |
| 2013/0212611 A1 | 8/2013 | Van et al. | |
| 2014/0040026 A1* | 2/2014 | Swaminathan | G06Q 30/00 705/14.66 |
| 2021/0136461 A1* | 5/2021 | Sullivan | G06Q 30/0241 |
| 2022/0141518 A1 | 5/2022 | Grover et al. | |
| 2023/0089199 A1 | 3/2023 | Panchaksharaiah et al. | |

* cited by examiner

*Primary Examiner* — Dominic D Saltarelli
(74) *Attorney, Agent, or Firm* — HALEY GUILIANO LLP

(57) ABSTRACT

Systems and methods are described for requesting media content playback. Media content item metadata relating to product endorsement in the media content item is accessed. An endorsement profile for the media content item is generated based on the media content item metadata. The endorsement profile comprises data relating to which segments of the media content item have product-related content. A manifest file comprising instructions re-questing playback of the media content item is generated based on the endorsement profile for the media content item.

20 Claims, 6 Drawing Sheets

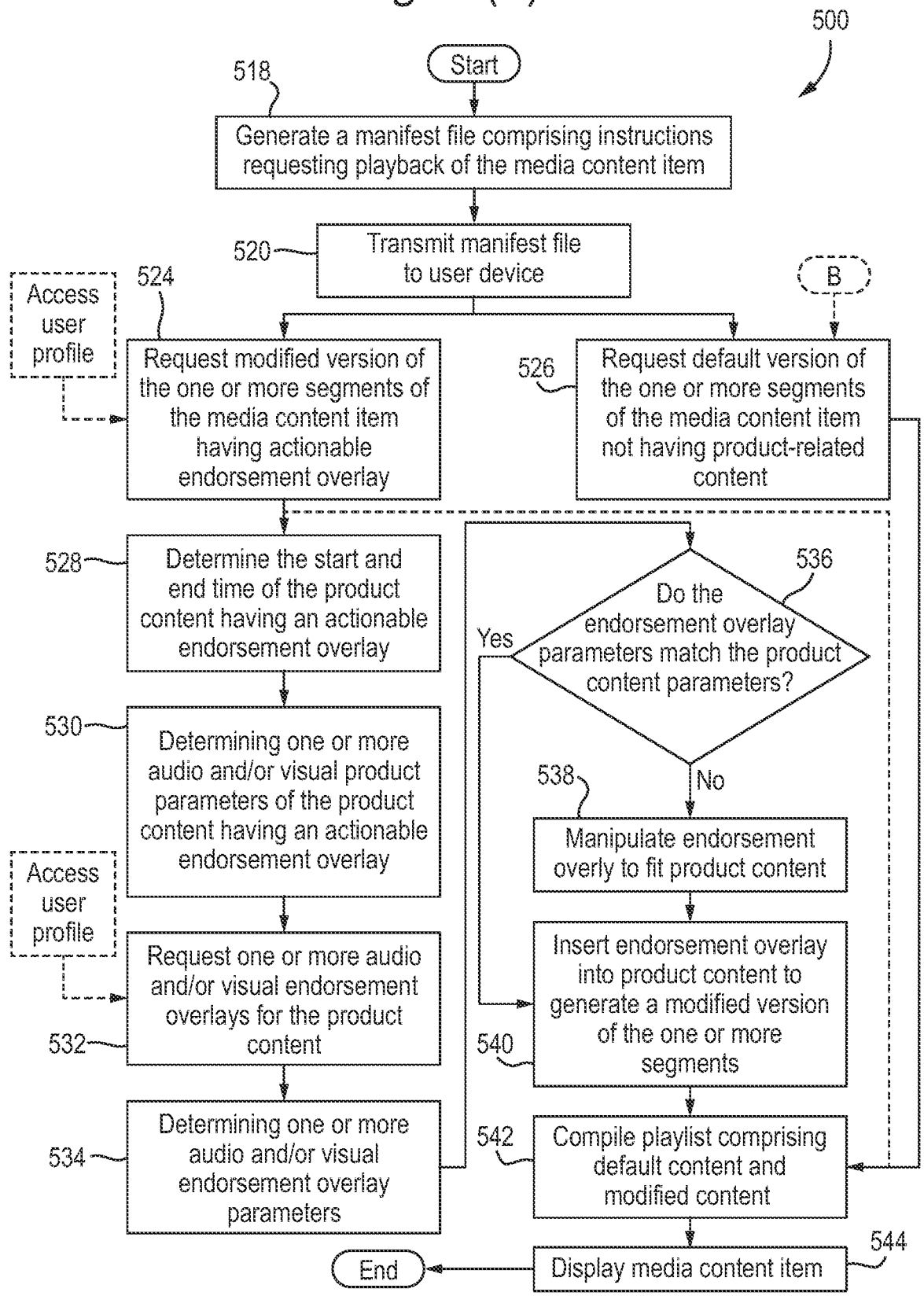

METHODS AND SYSTEMS FOR REQUESTING MEDIA CONTENT PLAYBACK

CROSS REFERENCE TO RELATED APPLICATIONS

This application is a continuation of U.S. patent application Ser. No. 17/479,607, filed Sep. 20, 2021, the disclosures of which is hereby incorporated by reference herein in its entirety.

BACKGROUND

The present disclosure relates to methods and systems for requesting media content playback. Particularly, but not exclusively, the present disclosure relates to generating an alternate version of a segment of a media content item by virtually replacing product-related content in a media content item with overlay content.

SUMMARY

The general concept of product placement in media content has been around for decades. For example, a production company or actor may get paid to endorse a product by referencing it in dialogue or by using a product in scene of a media content item. In some cases, a production company may record multiple versions of a scene, each version having a different product endorsement. More recently, to avoid producing multiple versions of a media content item, virtual product placement has been used, e.g., by inserting one or more virtual representations of a product in a media content item. However, it remains desirable to be able to delete, replace or adapt endorsements present in media content, e.g., based on individual user preferences.

Systems and methods are provided herein for modifying product-related content in a media content item, e.g., each time a media content item is requested for viewing by a user. Such systems and methods may provide an improved viewing experience for the user, e.g., by automatically generating modified content by overlaying one or more endorsements presented in the media content item. In some examples, the modified content may be generated according to the user's preferences, data relating to one or more historic actions of the user, and/or one or more topics of interest, e.g., a trending topic.

According to some examples of the systems and methods provided herein, media content playback is requested, e.g., at a user device. Control circuitry accesses media content item metadata, e.g., that is stored in an endorsement database. Media content item metadata relates to product endorsement in the media content item, e.g., how, when and/or where product endorsement in the media content item occurs. Control circuitry generates an endorsement profile for the media content item, based on the media content item metadata. The endorsement profile comprises data relating to which segments of the media content item have product-related content. Control circuitry generates a manifest file comprising instructions requesting playback of the media content item based on the endorsement profile for the media content item.

In some examples, generating the endorsement profile comprises identifying one or more segments of the media content item having product-related content and one or more segments of the media content item not having product-related content. For example, the endorsement profile may comprise one or more tags indicating the location and/or type of promotion presented to a viewer of the media content item.

In some examples, generating the endorsement profile comprises determining whether there is an endorsement restriction, e.g., a contractual limitation, for a segment of the media content item having product-related content. In some examples, the type of restriction is identified, e.g., a time-based restriction, and/or a geographical-based restriction.

In some examples, generating the endorsement profile comprises, in response to determining there is not an endorsement restriction for a segment of the media content item having product-related content, tagging the segment of the media content item having product-related content as having an actionable endorsement overlay.

In some examples, generating the endorsement profile comprises, e.g., in response to determining there is not an endorsement restriction for a segment of the media content item having product-related content, determining whether product endorsement overlay is possible and/or whether product endorsement overlay is effective. In response to determining that product endorsement overlay is possible and/or that product endorsement overlay would be effective, one or more segments of the media content item may be tagged as comprising product-related content having an actionable endorsement overlay.

In some examples, generating the endorsement profile comprises determining a start time and an end time of one or more segments of the media content item tagged as having an actionable endorsement overlay.

In some examples, the manifest file for the media content item comprises instructions requesting a modified version of one or more segments of the media content item having product-related content. In some examples, the manifest file for the media content item comprises instructions requesting a default version of one or more segments of the media content item not having product-related content. In some examples, control circuitry requests a modified version of one or more segments of the media content item that have product-related content. In some examples, control circuitry requests a default version of one or more segments of the media content item that do not have product-related content.

In some examples, control circuitry determines one or more audio and/or visual parameters of the product-related content, such as size, shape, location in a frame/scene of a media content item, etc.

In some examples, control circuitry requests an endorsement overlay for the product-related content. In some examples, control circuitry determines whether one or more audio and/or visual parameters of the endorsement overlay match the one or more audio and/or visual parameters of the product-related content. In some examples, in response to determining that the one or more audio and/or visual parameters of the endorsement overlay match the one or more audio and/or visual parameters of the product-related content, control circuitry generates a modified version of one or more segments of the media content item that have product-related content by inserting the endorsement overlay into the product-related content. For example, control circuitry may request a transcoded/re-encoded version of one or more segments of the media content item in which product-related content has been overlaid with an endorsement overlay.

In some examples, in response to determining that the one or more audio and/or visual parameters of the endorsement overlay do not match the one or more audio and/or visual parameters of the product-related content, control circuitry causes manipulation of the endorsement overlay to match the product-related content. In some examples, control circuitry generates a modified version of one or more segments of the media content item that have product-related content by inserting a manipulated overlay into the product-related content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
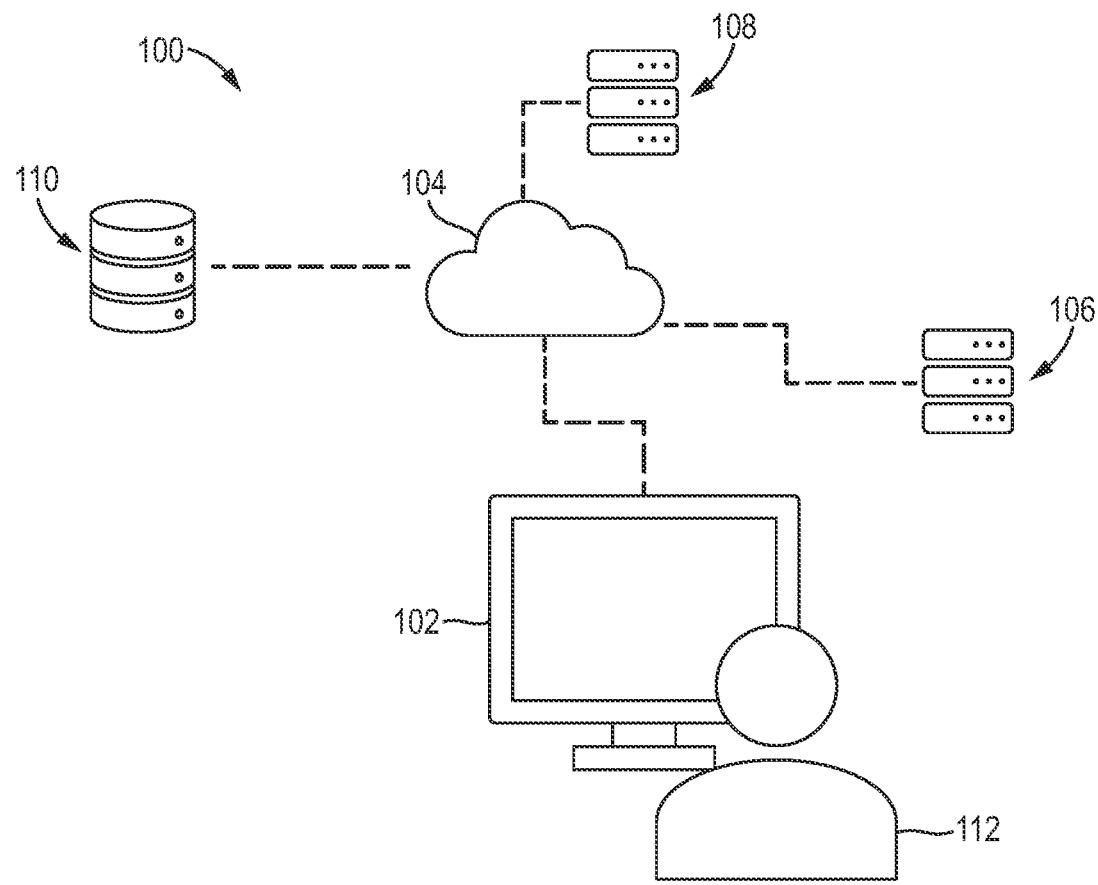
FIG. 1A illustrates an overview of a system for requesting media content playback, in accordance with some examples of the disclosure.
Figure 1B:
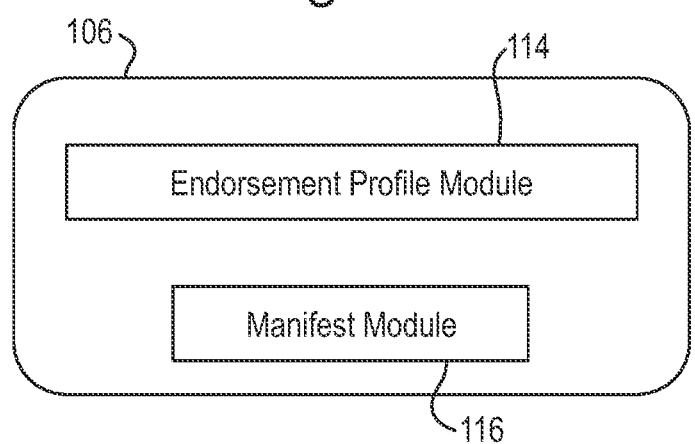
FIG. 1B illustrates a block diagram showing an exemplary component of FIG. 1A, in accordance with some examples of the disclosure.
Figure 2A:
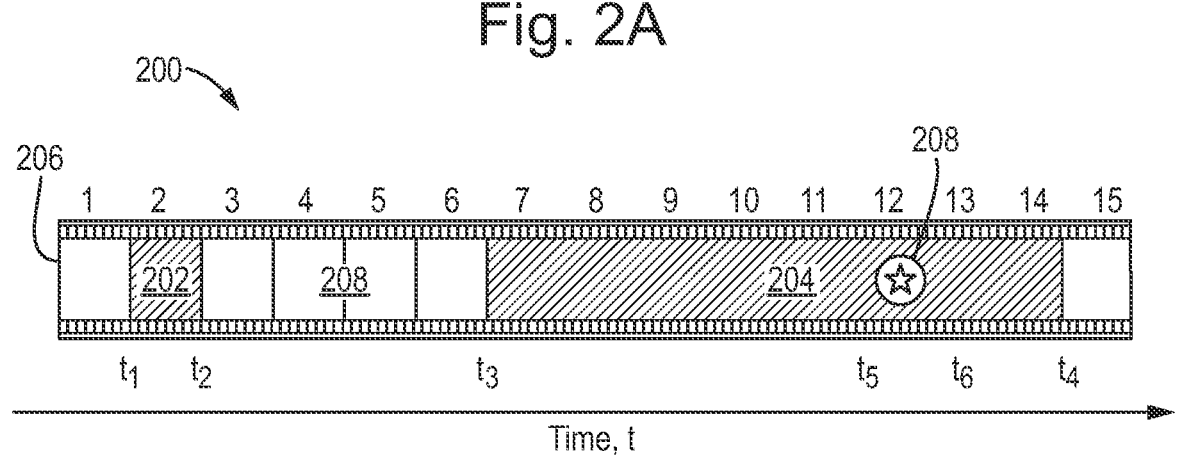
FIG. 2A illustrates a diagrammatic representation of an endorsement profile for a media content item, in accordance with some examples of the disclosure.
Figure 2B:
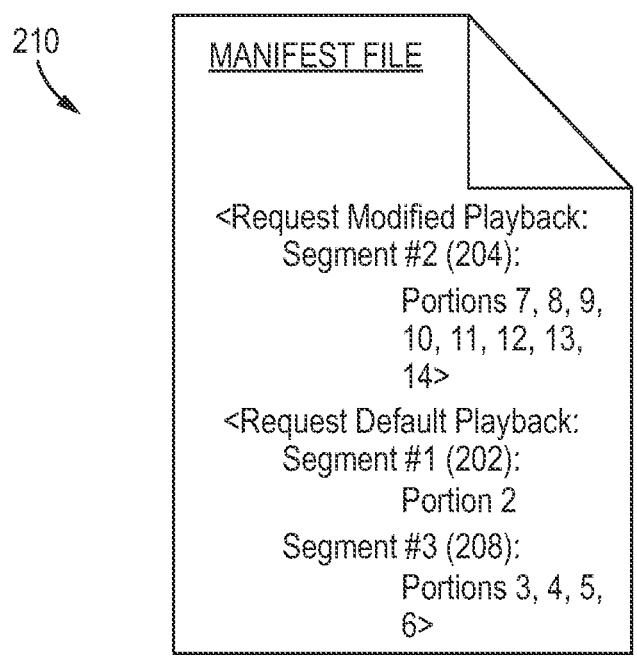
FIG. 2B illustrates a diagrammatic representation of a manifest file requesting playback of a media content item, in accordance with some examples of the disclosure.

FIG. 1A illustrates an overview of a system 100 for requesting playback of a media content item, e.g., by generating, based on an endorsement profile for the media content item, a manifest file comprising instructions for requesting playback of default and modified segments of the media content item, in accordance with some examples of the disclosure. FIG. 1B illustrates a block diagram showing an exemplary component of the system of FIG. 1A. FIGS. 2A and 2B show diagrammatic representations of an endorsement profile and a manifest file, respectively, for requesting playback of a media content item, in accordance with some examples of the disclosure. In particular, FIGS. 2A and 2B illustrate an endorsement profile generated by the endorsement profile module 114 of FIG. 1B and a manifest file generated by the manifest module 116 of FIG. 1B, respectively.

In some examples, system 100 includes a user device 102, such as a tablet computer, a smartphone, a smart television, or the like, configured to display media content to one or more users. System 100 may also include network 104 such as the Internet, configured to communicatively couple the user device 102 to one or more servers 106, 108 and/or one or more content databases 110 from which media content, such as TV shows, movies and/or advertisement content, may be obtained for display on the user device 102. User device 102 and the one or more servers 106, 108 may be communicatively coupled to one another by way of network 104 and the one or more servers 106, 108, 110 may be communicatively coupled to content database 110 by way of one or more communication paths, such as a proprietary communication path and/or network 104. In some examples, server 106 may be a server of a service provider who provides media content for display on user equipment 102, and server 108 may be a server of an ad provider who provides ad content for insertion into media content provided by the service provider. However, in other examples, the service provider and the ad provider may operate from a common server.

In some examples, system 100 may comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g., based on a user profile and/or an endorsement profile of the content item. For example, the application may provide a user with a recommendation based for a content item based on one or more endorsements present, e.g., visibly and/or audibly present, in the content item.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
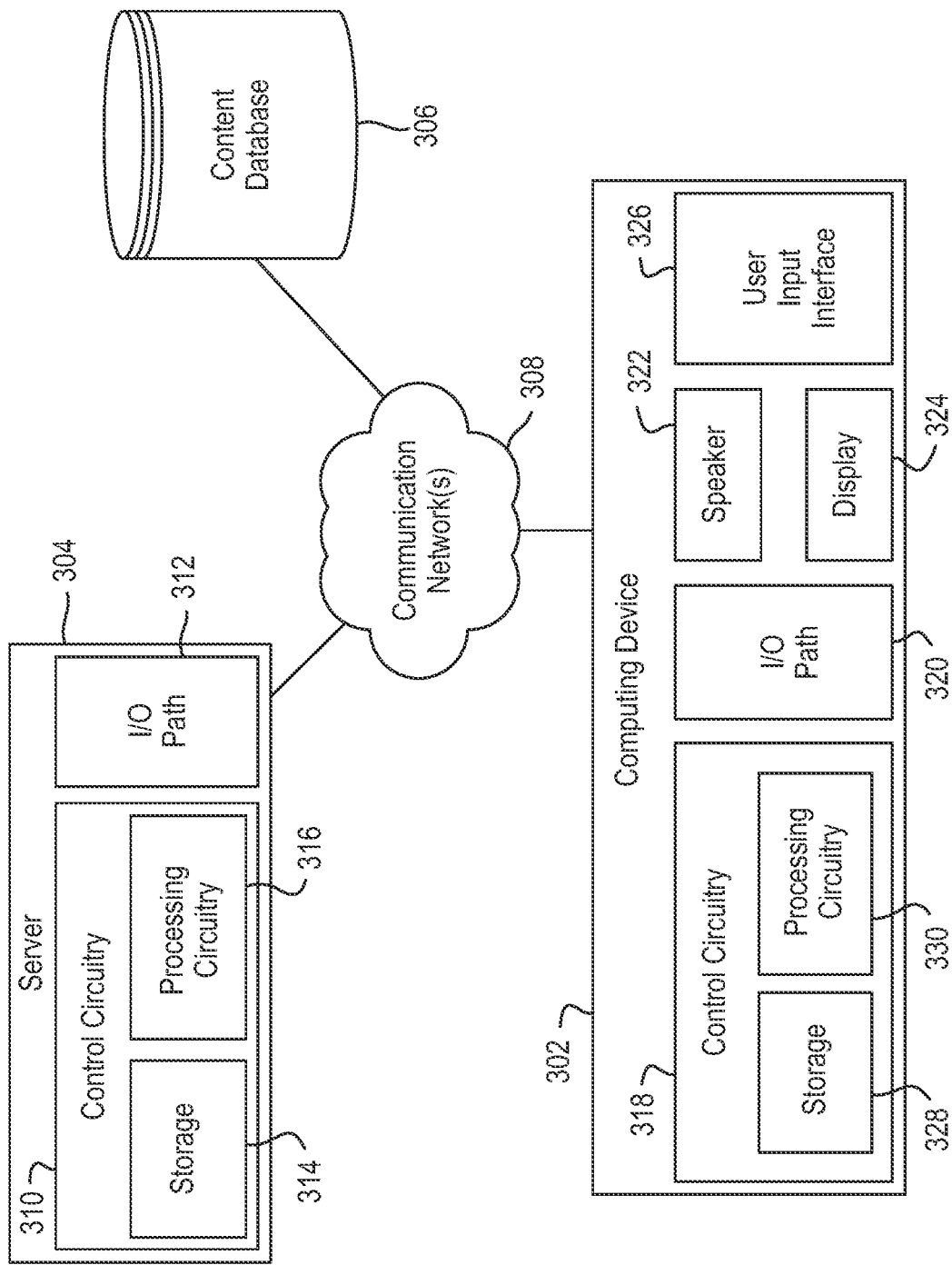
FIG. 3 is a block diagram showing components of an exemplary system for requesting media content playback, in accordance with some examples of the disclosure.

FIG. 3 is an illustrative block diagram showing exemplary system 300 configured to display media content. Although FIG. 3 shows system 300 as including a number and configuration of individual components, in some examples, any number of the components of system 300 may be combined and/or integrated as one device, e.g., as user device 102. System 300 includes computing device 302, server 304 (e.g., server 106 and/or server 108), and content database 306, each of which is communicatively coupled to communication network 308, which may be the Internet or any other suitable network or group of networks. In some examples, system 300 excludes server 304, and functionality that would otherwise be implemented by server 304 is instead implemented by other components of system 300, such as computing device 302. In still other examples, server 304 works in conjunction with computing device 302 to implement certain functionality described herein in a distributed or cooperative manner.

Server 304 includes control circuitry 310 and input/output (hereinafter "I/O") path 312, and control circuitry 310 includes storage 314 and processing circuitry 316. Computing device 302, which may be a personal computer, a laptop computer, a tablet computer, a smartphone, a smart television, a smart speaker, or any other type of computing device, includes control circuitry 318, I/O path 320, speaker 322, display 324, and user input interface 326, which in some examples provides a user selectable option for enabling and disabling the display of modified subtitles. Control circuitry 318 includes storage 328 and processing circuitry 330. Control circuitry 310 and/or 318 may be based on any suitable processing circuitry such as processing circuitry 316 and/or 330. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 314, storage 328, and/or storages of other components of system 300 (e.g., storages of content database 306, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 314, storage 328, and/or storages of other components of system 300 may be used to store various types of content, metadata, and or other types of data. Non-volatile memory may also be used (e.g., to launch a boot-up routine and other instructions). Cloud-based storage may be used to supplement storages 314, 328 or instead of storages 314, 328. In some examples, control circuitry 310 and/or 318 executes instructions for an application stored in memory (e.g., storage 314 and/or 328). Specifically, control circuitry 314 and/or 328 may be instructed by the application to perform the functions discussed herein. In some implementations, any action performed by control circuitry 314 and/or 328 may be based on instructions received from the application. For example, the application may be implemented as software or a set of executable instructions that may be stored in storage 314 and/or 328 and executed by control circuitry 314 and/or 328. In some examples, the application may be a client/server application where only a client application resides on computing device 302, and a server application resides on server 304.

The application may be implemented using any suitable architecture. For example, it may be a stand-alone application wholly implemented on computing device 302. In such an approach, instructions for the application are stored locally (e.g., in storage 328), and data for use by the application is downloaded on a periodic basis (e.g., from an out-of-band feed, from an Internet resource, or using another suitable approach). Control circuitry 318 may retrieve instructions for the application from storage 328 and process the instructions to perform the functionality described herein. Based on the processed instructions, control circuitry 318 may determine what action to perform when input is received from user input interface 326.

In client/server-based examples, control circuitry 318 may include communication circuitry suitable for communicating with an application server (e.g., server 304) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 308). In another example of a client/server-based application, control circuitry 318 runs a web browser that interprets web pages provided by a remote server (e.g., server 304). For example, the remote server may store the instructions for the application in a storage device. The remote server may process the stored instructions using circuitry (e.g., control circuitry 310) and/or generate displays. Computing device 302 may receive the displays generated by the remote server and may display the content of the displays locally via display 324. This way, the processing of the instructions is performed remotely (e.g., by server 304) while the resulting displays, such as the display windows described elsewhere herein, are provided locally on computing device 302. Computing device 302 may receive inputs from the user via input interface 326 and transmit those inputs to the remote server for processing and generating the corresponding displays.

A user may send instructions, e.g., to view an interactive media content item and/or select one or more programming options of the interactive media content item, to control circuitry 310 and/or 318 using user input interface 326. User input interface 326 may be any suitable user interface, such as a remote control, trackball, keypad, keyboard, touchscreen, touchpad, stylus input, joystick, voice recognition interface, gaming controller, or other user input interfaces. User input interface 326 may be integrated with or combined with display 324, which may be a monitor, a television, a liquid crystal display (LCD), an electronic ink display, or any other equipment suitable for displaying visual images.

Server 304 and computing device 302 may transmit and receive content and data via I/O path 312 and 320, respectively. For instance, I/O path 312 and/or I/O path 320 may include a communication port(s) configured to transmit and/or receive (for instance to and/or from content database 306), via communication network 308, content item identifiers, content metadata, natural language queries, and/or other data. Control circuitry 310, 318 may be used to send and receive commands, requests, and other suitable data using I/O paths 312, 320.

Figure 4:
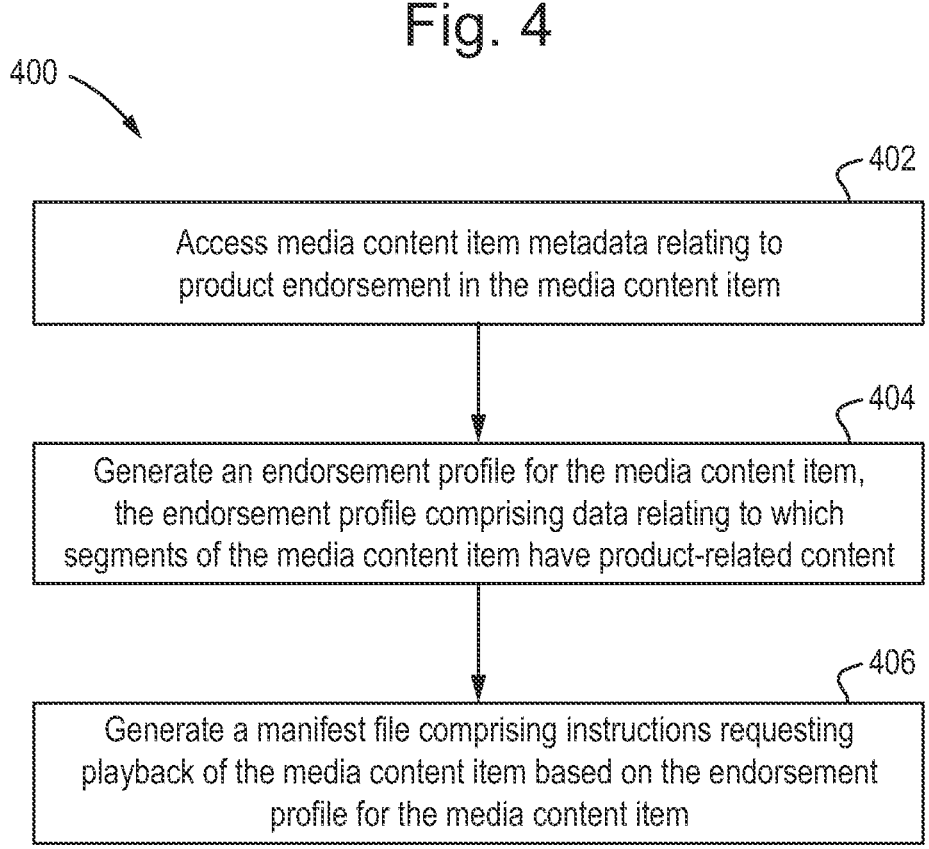
FIG. 4 is a flowchart representing a process for requesting media content playback, in accordance with some examples of the disclosure.

FIG. 4 is a flowchart representing an illustrative process 400 for modifying the content of a media content item, in accordance with some examples of the disclosure. While the example shown in FIG. 4 refers to the use of system 100, as shown in FIG. 1, it will be appreciated that the illustrative process shown in FIG. 4, and any of the other following illustrative processes, may be implemented on system 100, either alone or in combination with any other appropriately configured system architecture.

At step 402, control circuitry accesses media content item metadata relating to product endorsement in the media content item. For example, control circuitry may access, in response to receiving a request to play a media content item, one or more databases storing metadata relating to product-related content that is visibly and/or audibly present in the media content item. Product-related content (hereinafter referred to as product content) may comprise an item, such as a can of soda of a particular brand, that is visible in a frame or scene of the media content item. Additionally or alternatively, product content may comprise a portion of audio content, e.g., a line spoken by an actor, referring to a product, e.g., "This soda is so delicious". In some examples, metadata may describe one or more parameters relating to the product content, such as the type of product content, e.g., audio and/or visual content, a type of product referred to in the product content, e.g., a type of vehicle, one or more actors associated with the product content, e.g., an actor or actors who refer to a product in the product content, the location of the product content in the media content item, e.g., whether the product content is in the foreground or the background of a frame or scene, and/or one or more timing parameters relating to when and/or for how long a product can be seen and/or heard in the product content, e.g., a start time and/or an end time relating to when the product can be seen and/or heard in the product content. In some examples, media content item metadata may comprise data relating to the age of a product endorsement in a media content item, e.g., when the media content item was first produced/released, and/or for how long a product has been on the market, e.g., a release date of the product present in the product content. In some examples, media content item metadata may comprise data relating to the popularity of a product present in the product content. For example, popularity data may be determined using one or more sources of data relating to sales/use statistics for a product, and/or based on whether a product is trending, e.g., on a social media platform. In some cases, popularity data may describe how popular or how unpopular a product is. For example, popularity data may comprise data relating to controversy surrounding a product, which may be based on one or more press articles relating to a product. In some examples, media content item metadata may comprise data pertaining to one or more contractual/licensing agreements relating to the presence of a product in the product content. For example, media content item metadata may comprise data relating to one or more restrictions regarding the inclusion, prominence, placement, etc., of a product, in a frame or scene of the media content item.

At step 404, control circuitry generates an endorsement profile 200 for the media content item, e.g., based on media content item metadata, indicating which segments of the media content item have product content. Additionally or alternatively, the endorsement profile 200 may comprise data relating to how product content is presented (e.g., visibly and/or audibly, etc.) within one or more segments of the media content item, e.g., based on media content item metadata. In the context of the present disclosure, a segment of a media content item is understood to mean any appropriate portion or portions of a media content item, such as at least one frame, scene, chapter, episode, etc., or combination thereof. FIG. 2A illustrates an endorsement profile 200 representing, for the sake of example only, 15 portions of a media content item. While the portions of the media content item are shown as 15 equal portions, it is understood that the portions may be of various sizes. The endorsement profile 200 indicates that portion 2 and portions 7 to 14 comprise product content. As such, the endorsement profile shown in FIG. 2 indicates a first segment 202 having product content and a second segment 204 having product content. The endorsement profile indicates that the first segment 202 has a start time t1 and an end time t2, and that the second segment 204 has a start time t3 and an end time t4. In some examples, the start and end times of a segment may indicate the start and end times, e.g., the duration, for which the product content is presented in the segment of the media content item. Alternatively, the start and end times of a segment may indicate the start and end times of a scene containing the product content. Irrespective of what the start and end times relate to, they may be used as an indication of the duration for which a product is referred to in the segment.

In some examples, endorsement profile 200 may be represented in a JSON data structure as an object literal containing key-value pairs. For example, product content that can be replaced can be referenced in such data structure by including times that they appear within a video, their location with reference to a landmark within the frame, link(s) to the content that they can be replaced with, etc. In some examples, the content of the JSON string may be personalized for specific viewers including choosing a preferred color for the item to display, model, etc. by modifying the value of any key.

In some examples, media content item metadata is readily available (e.g., from the content creator). Additionally or alternatively, closed-caption data (e.g., a sidecar file) may be used to parse and build the endorsement profile for any given media content item. For example, computer vision technologies and algorithms may be used to determine whether a specific item is present in media content or generate a list of all items that were recognized by the algorithm, in which case these items can be grouped and a preferred item(s) for a specific viewer can be located within the video content item if a modification (e.g., replacing item within the frame) is recommended. Similarly, audio processing technologies may be used to detect the presence of a word or term in the dialogue. For example, a computer vision service typically includes many algorithms that can process images and return information on specific visual features. In some examples, algorithms include the extraction of text from images (e.g., using optical character recognition), or even identifying faces, objects, etc., in a video frame. In some examples, algorithms for detecting where people are present in a video and tracking their movements, etc. can also be relied upon to determine product content. Additionally or alternatively, a dedicated service can train AI models or rely on pre-trained models to accomplish such a task.

At step 406, control circuitry generates a manifest file 210 comprising instructions requesting playback of the media content item based on the endorsement profile 200 for the media content item. For example, control circuitry may generate a manifest file 210 comprising instructions requesting playback of modified content for the segment(s) of the media content item for which the endorsement profile 200 indicates the presence of product content. Additionally, the manifest file may comprise instructions requesting playback of default content for the segment(s) of the media content item for which the endorsement profile 200 does not indicate the presence of product content. In the context of the present disclosure, modified content is understood to mean content in which product content has been overlaid with alternative content. For example, control circuitry may be configured to insert one or more endorsement overlays into the product content to alter how a user perceives, audibly and/or visually, the original product content. In some examples, an endorsement overlay may comprise blurring or obscuring a product visible in a frame or scene of a media content item, e.g., such that a user can no longer visually discern the product content. Additionally or alternatively, an endorsement overlay may comprise temporarily muting a media content item, or at least muting the speech of an actor, such that a user can no longer hear a product to which an actor is referring. The process of generating modifying content, e.g., by inserting one or more endorsement overlays into the product content, is discussed below in relation to process 500. In contrast to modified content, default content may comprise original content available from a service provider, e.g., a version of the media content item as produced/released for general consumption by a content producer, or any other available content that does not qualify for insertion of one or more endorsement overlays, e.g., by virtue of a lack of product content.

In some examples, control circuitry may use the manifest file 210 to request playback of a media content item, e.g., on user device 102. For example, control circuitry may request transmission of default content, e.g., from server 106, and may request transmission of modified content, e.g., from server 108. In this manner, a media content item comprising default content and modified content may be played back on user device 102.

The actions or descriptions of FIG. 4 may be used with any other example of this disclosure, e.g., the example described below in relation to FIG. 5. In addition, the actions and descriptions described in relation to FIG. 4 may be done in any suitable alternative orders or in parallel to further the purposes of this disclosure.

Figure 5:
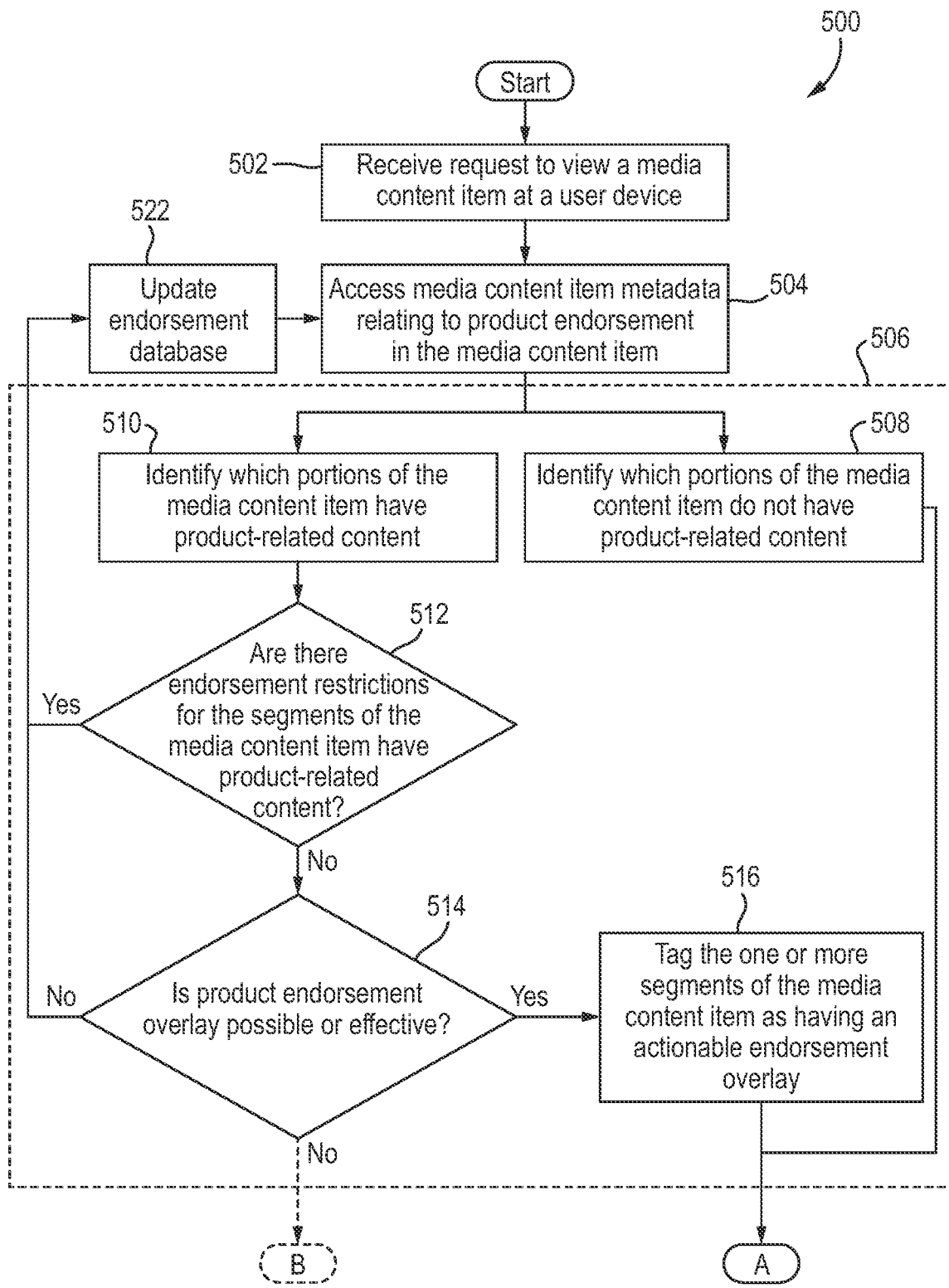
FIG. 5 is a flowchart representing process for process inserting an endorsement overlay over product-related content to generate a modified version of a segment of a media content item, in accordance with some examples of the disclosure.

FIG. 5 is a flowchart representing an illustrative process 500 for generating, for display on a user device, a media content item having one or more endorsement overlays inserted into the media content item, in accordance with some examples of the disclosure. While the example shown in FIG. 5 refers to the use of system 100, as shown in FIG. 1, it will be appreciated that the illustrative process shown in FIG. 5, and any of the other following illustrative processes, may be implemented on system 100, either alone or in combination with any other appropriately configured system architecture.

At step 502, control circuitry receives a request to view a media content item at a user device. For example, user 112 may use a media guidance application to search for one or more media content items, e.g., a movie, that they wish to view. While process 500 will be described in relation to the consumption of a media content item, such as a movie, it should be understood that the systems and methods disclosed herein apply equally to the consumption of audio content, such as podcast and audiobooks, where technically appropriate.

At step 504, control circuitry accesses media content item metadata relating to product endorsement in the media content item, e.g., in a similar manner to that described at step 402 of process 400. In some examples, control circuitry, e.g., of server 106, may be configured to request media content item metadata relating to product endorsement in the media content item, e.g., from server 108. For example, ad server 108 may store metadata relating to product endorsement in multiple media content items available from one or more content providers. Metadata relating to product endorsement in the media content item may be stored in an endorsement database, which may be accessible by any number of content providers. For example, ad server may provide a service to supply to one or more content providers media content item metadata relating to product endorsement in the media content item requested by user 112.

At step 506, control circuitry generates an endorsement profile 200 for the media content item, the endorsement profile 200 comprising data relating to which segments of the media content item have product-related content. Step 506 may be carried out in a similar manner to step 404 of process 400. In the example shown in FIG. 5, step 506 comprises steps 508 to 516, which may be implemented in combination with any of the processes described by step 404 of process 400, where appropriate.

At step 508, control circuitry identifies which portions of the media content item (which is represented by illustrative film reel 206 in FIG. 2A) do not have product content, based on the media content item metadata relating to product endorsement. For example, control circuitry may analyse the media content item metadata to determine that portions 3 to 6 of the media content item do not comprise product content, e.g., where portions 3 to 6 represent a scene of a movie without the presence of any products. In some examples, control circuitry may be configured to analyse the content of the media content item, e.g., using one or more image processing techniques, to determine the content of the media content item. For example, image-based analysis of the media content item by control circuitry may determine that portions 3 to 6 of the media content item contain a scene that does not comprise any product content. In some examples, the portions of the media content item that do not contain any product content may be tagged as such, e.g., by an ad provider and/or a content provider, so that those portions are easily identifiable. For example, media content item metadata may indicate the start time and the end time of a segment of the media content item that does not contain product content, e.g., media content item metadata may indicate that segment 208, comprising portions 3 to 6 and having a start time t2 and an end time t3, does not contain any product content. Upon identification of the portions of the media content item that do not contain any product content, e.g., segment 208, process 500 moves to step 518, which is described below in further detail.

Returning to step 510, control circuitry identifies which portions of the media content item have product-related content, based on the media content item metadata relating to product endorsement. For example, control circuitry may analyse the media content item metadata to determine that portion 2 and portions 7 to 14 of the media content item comprise product content, e.g., where portion 2 and portions 7 to 14 represent scenes of a movie showing product content. In some examples, image-based analysis of the media content item by control circuitry may determine that portion 2 and portions 7 to 14 of the media content item contain product content, e.g., by running a matching algorithm that matches one or more products displayed in a frame or scene to one or more images or videos stored in a library, such as the endorsement database. In the example shown in FIG. 2A, media content item metadata indicates the start time and the end time of each segment of the media content item that contains product content, e.g., media content item metadata indicates that segment 202, comprising portion 2 and having a start time t1 and an end time t2, and segment 204, comprising portions 7 to 14 and having a start time t3 and an end time t4, contain product content. Upon identification of the portions of the media content item that contain product content, e.g., segments 202 and 204, process 500 moves to step 512.

At step 512, control circuitry determines if there are any endorsement restrictions for the segments of the media content item that have product content. For example, one or more content licensing agreements associated with the media content item may contain restrictions regarding how product content should be displayed in the media content item. In some examples, a licensing agreement, e.g., between a product manufacturer and a content provider, might prevent some in-content products from being replaced or otherwise modified from that stipulated in the licensing agreement. As such, it is important that the endorsement profile 200 for the media content item indicates which product content can be replaced and/or modified. In some examples, the media content item metadata may indicate that product content replacement or modification is allowed in specific scenes but not others. For example, the media content item metadata may indicate that a phone endorsement that is conveyed through placing the phone on a table and/or mentioning it in a dialogue (e.g., Actor A: "This phone is awesome") can be replaced or updated to show a newer model of the phone, but replacement of the product by reference to a different product, such as a beverage, may not be allowable under the terms of the licensing agreement. Such information may be accessible to the ad service provider to assist in determining what product content can be replaced or modified. As such, step 512 comprises control circuitry checking whether any licensing agreements associated with the media content item may contain restrictions regarding how product content can be replaced and/or modified. When it is determined that there are not any restrictions regarding the replacement or modification of product content, process 500 moves to step 514. When it is determined that there are one or more restrictions regarding the replacement or modification of product content, process 500 moves to step 522.

At step 522, control circuitry causes media content item metadata to be updated to indicate whether there are any restrictions regarding the replacement or modification of product content. In some examples, the media content item metadata may be updated by the ad service provider if and when new information regarding any such restrictions are determined. In some examples, the updated media content item metadata, e.g., indicating whether there are any endorsement restrictions for the media content item, may be used in a subsequent iteration of process 500, e.g., where the same media content item is selected for viewing. In some examples, of such updated metadata may help simplify the operations involved in step 506.

At step 514, control circuitry determines whether a product endorsement overlay is possible. In the context of the present disclosure, a product endorsement overlay is any appropriate modification to the product content that results in the product content no longer being discernable by a viewer. For example, a product endorsement overlay may comprise content that censors or obscures original product content, such as pixilation or blurring of visual product content, and/or muting or bleeping audio product content. In some examples, product endorsement overlay may comprise content replaces the product content with alternative content, such as updated product content or product content relating to a different product. For example, a product endorsement overlay may comprise an image of a soda can configured to replace existing product content, e.g., another beverage, in the media content item. At step 514, control circuitry may determine whether there are any factors that might prevent, or substantially limit the practicality of, a product endorsement overlay being inserted/added into the media content item. In other words, control circuitry may determine one or more limiting conditions, other than a legal restriction in a licensing agreement, that might restrict how, or if, product content can be replaced or modified. In some examples, control circuitry may determine how a product is displayed in the media content item, e.g., duration, size, angle, position, etc. For example, control circuitry may compare the duration of a segment of the media content item having product content to a predetermined period. In some examples, where the duration of a segment of the media content item having product content is less than the predetermined period, control circuitry may determine that replacement or modification of the product content is restricted to the point where a product endorsement overlay would not be effective. For example, control circuitry may determine that the duration of segment 202 is too short to effect replacement or modification of the product content, e.g., to the point whereby a viewer would find it hard to even notice the replacement or modification of the product content. Conversely, control circuitry may determine that segment 204 contains product content not having any limiting factors, e.g., duration, visibility, etc., that may restrict the replacement or modification of the product content. When it is determined that product endorsement overlay is not possible, or is at least below an effectiveness threshold, e.g., based on the duration of the product content, process 500 moves to step 522, where media content item metadata is updated to indicate that product endorsement overlay is not possible for the identified segment. Additionally or alternatively, process 500 may bypass the updating step and move directly to step 526, which is discussed below in more detail. When it is determined that product endorsement overlay is possible, or is at least equal to or above an effectiveness threshold, e.g., based on the duration of the product content, process 500 moves to step 516.

At step 516, control circuitry tags one or more segments of the media content item as having an actionable endorsement overlay. For example, control circuitry may add a tag, e.g., tag 208, to endorsement profile 200 indicating that segment 204 comprises an actionable endorsement overlay. Any tags that are added to the endorsement profile 200 may be used to help generate manifest file 210 and/or assist in the replacement and/or the modification of product content in the media content item.

At step 518, control circuitry generates a manifest file 210 comprising instructions requesting playback of the media content item, based on the endorsement profile 200. In the example shown in FIG. 2B, the manifest file 210 comprises instructions requesting playback of a modified version of segment 204, and playback of default versions of segments 202 and 208. The manifest file 210 may further contain information regarding the portions of the media content item making up each of the identified segments.

At step 520, control circuitry transmits manifest file 210 to user device 102, e.g., to enable user device 102 to request default and/or modified versions of segments of the media content item from one or more appropriate sources, and allow user device 102 to create a playlist comprising required segments of the media content item for display to user 112. In some examples, control circuitry may transmit manifest file 210 directly to a content provider and/or an ad provider, with instructions to supply default/modified versions, as appropriate, directly to user device 102.

At step 524, control circuitry, e.g., of user device 102, requests a modified version of the one or more segments of the media content item having actionable endorsement overlay. For example, control circuitry of user device 102 may request, from ad server 108, a modified version of product content in the media content item that has been identified as having actionable endorsement overlay. In some examples, ad server 108 may communicate with content server 106 to request a default version of one or more segments of the media content item requiring endorsement overlay, so that ad server may perform an endorsement overlay operation on the default version. In some examples, ad server 108 may access a database to search for one or more previously modified versions of the segments of the media content item having actionable endorsement overlay. For example, if user device 102 requests a modified version of segment 204 of the media content item, ad server 108 may search for a previously modified version of segment 204. In some examples, where one or more previously modified versions of segment 204 can be accessed, ad server 108 may access a user profile to check if one or more of the previously modified versions of segment 204 are suitable for display to user 112. For example, a user profile for user 112 may indicate a preference for, or preference against, a particular brand of beverage. As such, ad server 108 may check whether one or more of the previously modified versions of segment 204 match or conflict with one or more of the user's preferences. Where a previously modified version of segment 204 matches a user's preference, that modified version may be transmitted to user device 102 for use in generation of a playlist (see dashed line to step 542, described in more detail below). Where ad server 106 cannot identify any previously modified versions, or cannot identify any previously modified versions that match the user's preferences, process 500 moves to step 528. In some examples, segment modification does not need to occur upon request of the specific segment. For example, those segments with a tag associated with them may be requested ahead of time if it is determined that the segment will likely be requested. In such case, the segment is processed/cached and served to a player of the user device 102 upon request. This is especially useful to avoid delays and to provide the user with a seamless viewing experience. In some examples, default segments can be shown in cases where processing the segment to include a new product may cause the player to stall video playback. For example, a default segment is played if the player's buffer is below a predetermined threshold when the modified segment was requested. However, if a cached segment is available (e.g., a segment that was created for a different viewer), then such a segment can be fetched, if it is determined that it matches the user profile. As a result, there might be no need to process specific segments for every viewer.

At step 528, control circuitry determines the start and end time of the product content in the one or more segments of the media content item having an actionable endorsement overlay, e.g., to begin a process of generating a modified version of a media content item segment by inserting an endorsement overlay into the segment. In some examples, ad server 108 may determine the position and duration of the product content in the media content item segment based on media content item metadata. However, where media content item metadata does not contain information regarding the position and duration of the product content in the media content item segment, or such media content item metadata is not accessible, ad server 108 may analyse a default version of the media content item segment to determine the position and duration of the product content in the media content item segment. For example, ad server 108 may use one or more image processing techniques to determine the position and duration of the product content in the default version, e.g., ad server 108 may determine that an actionable endorsement overlay has a start time, an end time and a duration within the default segment. For example, ad server 108 may determine that a default version of segment 204 comprises a scene displaying a particular brand of a beverage can for 10 seconds, e.g., between time t5 and t6, as shown in FIG. 2A. In some examples, the position of tag 208 may correspond to, e.g., indicate, the start time, the end time and/or the duration of the product content within the default segment, At step 530, control circuitry determines one or more audio and/or visual product parameters of the product content having an actionable endorsement overlay. For example, ad server 108 may analyse the product content to determine the size, shape, angle, position within a scene (e.g., background/foreground), and/or any other appropriate audio and/or visual product parameter that defines how a product is perceived in the product content. For example, ad server 108 may use one or more image processing techniques to determine that the can of beverage is positioned in the background of a scene, is visible at a ¾ angle at time t5 and a frontal angle at time t6 (e.g., the scene contains a change in the angle of shot of the can of beverage), and that the can of beverage is partially obscured during the time for which it is visible in the scene. In some examples, the media content item metadata At step 532, control circuitry requests one or more endorsement overlays for the product content. For example, ad server 108 may access (and/or provide instructions to access) a library of content comprising various endorsement overlay options. In some examples, ad server 108 may access a user profile to determine one or more user preferences, e.g., relating to a preferred product or user interest. Where the user's profile indicates a preference for a particular product or brand, ad server 108 may request one or more endorsement overlays from a library relating to the user's interests. For example, where the user's profile indicates that the user has a preference for a particular brand of beverage, ad server 108 may request one or more product overlays relating to that beverage brand. In some examples, ad server 108 may offer for tender to one or more providers of endorsement overlay content the opportunity to provide an endorsement overlay for the product content. In some examples, ad server 108 may access data relating to the popularity of products, e.g., data relating to sales statistics of various brands of beverage, and/or data relating to one or more products that are trending, e.g., on social media and/or eCommerce sites, and use such data to select an endorsement overlay, e.g., when providing a modified version of a segment of the media content item having an actionable endorsement overlay. Additionally or alternatively, ad server 108 may access data relating to transmission statistics and/or viewing history of previously shown ads, e.g., a list of the top 10 ads served to an audience on a specific platform (e.g., mobile, connected TVs, etc), and use such data to select an endorsement overlay, e.g., when providing a modified version of a segment of the media content item having an actionable endorsement overlay. Where a particular product has been identified as popular, ad server 108 may request (and/or provide content server 106 with instructions to request) one or more endorsement overlays comprising that popular product. In some examples, metadata regarding user history may be used to determine one or more targeted ads to display to the viewer 112, e.g., based on or using the user profile. For example, content item metadata may be used to indicate the location of an actionable endorsement overlay in a portion of the media content item that user 112 is about to watch, e.g., in the next 5 minutes. In this manner, content server 106 may identify a particular portion of the media content item having product related content that is eligible for overlay with content targeted towards the user's interests. In some examples, the media content item metadata may indicate the type of product related content (e.g., content relating to a particular brand of smart phone), and ad server 108 may use the media content item metadata to point content server 106 to the location of one or more endorsement overlays that matches the product related content and relates to the interests of the user. As such, a content provider may provide to a user an "overlay service" that can then make a determination regarding which endorsement overlay to place onto a frame/scene of a media content item that the user is watching.

At step 534, control circuitry determines one or more audio and/or visual endorsement overlay parameters. For example, ad server 108 may analyse the endorsement overlay content to determine the duration, size, shape, angle, and/or any other appropriate audio and/or visual product parameter that defines how the endorsement overlay is perceived. For example, ad server may determine if one or more of the product overlays are appropriate for replacing, e.g., by virtue of overlaying, product content that is part of the media content item. This solution allows a product that was originally endorsed during a scene when the media content item was created or recorded to be modified, e.g., so that the original product can no longer be seen by a viewer, either by being skipped, obscured or otherwise replaced, e.g., by another product.

At step 536, control circuitry determines if the endorsement overlay parameters match the product content parameters. For example, ad server 108 may compare one or more of the endorsement overlay parameters with the product content parameters, to determine if an endorsement overlay is appropriate to replace the product content. It is important to determine that the endorsement overlay parameters match the product content parameters to ensure that the endorsement overlay fits into the media content item in a manner that obscures the original product content without showing noticeable artifacts. For example, ad server may determine that one or more of the requested endorsement overlays comprise overlay parameters indicating that the overlay will fit the product content comprising a can of beverage positioned in the background of a scene, that is visible at a ¾ angle at the start of the overlay and a frontal angle at the end of the overly (e.g., so that the overlay contains a change in the angle of shot of the can of beverage), and that the can of beverage is partially obscured throughout the duration of the overlay. Where it is determined that the endorsement overlay parameters match the product content parameters, e.g., within a predetermined threshold (e.g., 95% match or 80% match, depending on the context of the required overlay), process 500 moves to step 540. Where it is determined that the endorsement overlay parameters do not match the product content parameters, e.g., within a predetermined threshold (e.g., 95% match or 80% match, depending on the context of the required overlay), process 500 moves to step 538.

At step 538, control circuitry manipulates an endorsement overly to fit product content. For example, it is desirable to alter the endorsement overlay to "fit in" the frame in a way to obscure the original item without showing noticeable artifacts. For example, using one or more computer vision techniques (such as, Azure's "Area Of Interest" API), product content parameters may be determined to a level where the location of the product content in the media content item (e.g., region and coordinates) can be identified so that the endorsement overly can be manipulated (e.g., rotated, resized, sped up, slowed down, etc.) in order to fit over the area of interest, i.e., the product content. In some examples, the endorsement overlay may be chosen to be added to the media content item based on the shape of the area of interest. For example, the area of interest might be rectangular and suited for a phone. Alternatively, the area of interest may include a phone, and thus it is best that an item with a similar shape to the phone is used as the endorsement overly. In some examples, the area of interest could be a key that is also part of the endorsement profile and whose value is a shape or coordinates (e.g., square, rectangle, circle, etc.) which is used to narrow down the set of items that can be presented. This is also beneficial when a choice between two overlays needs to be made, and thus the items' shape can be used to determine which one to select.

At step 540, control circuitry selects an endorsement overlay for insertion into the product content to generate a modified version of the one or more segments. For example, control circuitry modifies a default version the segment containing the product content, e.g., a default segment received from content server 106, by inserting the endorsement overlay over the product content, so that the product content is no longer discernible in the modified version of the segment. For example, using the above example relating to a beverage can that is visible in a scene of the media content item, an endorsement overlay may be selected and inserted into the scene to obscure the beverage can's visibility. In some examples, the purpose of the endorsement overlay may be to censor media content item, e.g., owing to controversy relating to the product originally shown in the media content item. In other examples, the purpose of the endorsement overlay may be to replace the original endorsement with an updated endorsement, for example, by overlaying a new version of the product onto an older version, or by replacing one brand's product with another brand's product.

In some examples, process 500 comprises a step of identifying one or more other instances in the media content item where the same endorsement overlay or a similar endorsement overlay may be inserted, e.g., subsequent to, or as part of, step 542. For example, control circuitry may be configured to assess the similarity of multiple segments of the media content item each having one or more actionable endorsement overlays. In those cases where multiple actionable endorsement overlays have the same, or similar, characteristics, e.g., by virtue of matching the same or similar product content, control circuitry may be configured to automatically insert one or more other (same or similar) endorsement overlays over instances of product content throughout the media content item (and/or in another media content item). This may be based on a library of content comprising various endorsement overlay options, e.g., the library generated under step 532, as described above. In some examples, the multiple actionable endorsement overlays that have the same, or similar, characteristics may be part of the same media content item or different media content items e.g., different episodes of a TV show. In this manner, modification of one segment of a media content item may be based at least in part on one or more previously generated versions of a segment of the same media content item or another media content item.

It is important to note that ad server 108 incorporates the endorsement overlay into the segment by re-encoding and transcoding the segment (as opposed to the overlaying occurring at the client side, e.g., at the user device 102). In some examples, an HTTP GET request for the segment that is associated with a tag (described earlier) is issued to the ad server 108 running the replacement algorithm/logic and then sent back to the client for playback on user device 102. Following insertion of the endorsement overlay(s) over the product content, the modified version(s) of the segment may be transmitted to user device 102. In some examples, insertion of endorsement overlay(s), e.g., comprising newer product information, over the original product content, e.g., comprising older product information, may be made when, e.g., only when, the newer product information is referenced elsewhere in the media content item, e.g., as part of dialogue in the media content item. This may be beneficial in narrowing down the amount of product content that is replaced throughout the media content item, since the product content needs to be present visually and referenced in the dialogue as well. In some examples, use of an endorsement overlay may be tracked for accounting purposes and/or for other statistics, such as to estimate the endorsement overlay's reach.

At step 542, control circuitry compiles a playlist comprising default content and modified content. For example, default content, requested at step 526, may be combined with modified content, received from the ad server, to generate a playlist for the media content item that results in the media content item being displayed to viewer 112 in a manner whereby the only noticeable differences between an original media content item and the version of the media content item generated using process 500 is the overlay of product content. For example, the systems and methods disclosed herein may be user to replace one brand's beverage with another brand's beverage throughout the entirety of the media content item. Such system and methods may be beneficial where one or more historic licensing agreements have terminated, allowing for new agreements to be made. However, without use of the system and methods disclosed herein, replacement of original endorsements would be difficult or impossible, since such replacement may only be made by re-shooting the media content item.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating, using control circuitry, an endorsement profile
      for a media content item based on media content item metadata, the endorsement profile comprising data identifying a plurality of segments of the media content item that have product-related content and data identifying, for each of the identified plurality of segments, whether an overlay for the corresponding product-related content is below an effectiveness threshold, wherein the effectiveness threshold is based on at least one of a duration of the product-related content, a size of a product in the product-related content, an angle of the product in the product-related content, or a position of the product in the product-related content;

generating, using control circuitry, a manifest file comprising instructions that, when executed by a processor, cause a user device to request the media content item based at least in part on the plurality of segments identified by the endorsement profile for the media content item; and transmitting, using control circuitry, the manifest file to the user device.

2. The method of claim 1, wherein generating the endorsement profile comprises:

in response to determining that the overlay for the product-related content is not below the effectiveness threshold, tagging a segment of the media content item having the product-related content as having an actionable overlay.

3. The method of claim 1, wherein generating the endorsement profile comprises:

in response to determining that the overlay for the product-related content is below the effectiveness threshold, including in the manifest file a request for a default version of one or more segments of the media content item that do not have the product-related content.

4. The method of claim 1, wherein generating the endorsement profile further comprises:

determining whether there is an endorsement restriction for a segment of the media content item having the product-related content; and in response to determining there is not an endorsement restriction for the segment of the media content item having the product-related content, tagging the segment of the media content item having the product-related content as having an actionable overlay.

5. The method of claim 1, wherein the endorsement restriction comprises a limiting condition that restricts how or if the product-related content can be replaced or modified.

6. The method of claim 1, the method further comprising:

updating the media content item metadata based on the generated endorsement profile.

7. The method of claim 1, wherein the manifest file for the media content item comprises instructions requesting a modified version of one or more segments of the media content item having the product-related content, and a default version of one or more segments of the plurality of segments of the media content item not having the product-related content, the method further comprising:

compiling a playlist comprising the modified version of one or more segments of the media content item and the default version of one or more segments of the media content item.

8. The method of claim 1, the method further comprising:

requesting multiple overlays for the product-related content;

determining whether one or more audio and/or visual parameters of one of the overlays matches one or more audio and/or visual parameters of the product-related content; and in response to determining that the one or more audio and/or visual parameters of one of the overlays matches the one or more audio and/or visual parameters of the product-related content, generating a modified version of one or more segments of the plurality of segments of the media content item that have the product-related content by inserting the overlay into the product-related content.

9. The method of claim 8, the method further comprising:

in response to determining that the one or more audio and/or visual parameters of each of the overlays do not match the one or more audio and/or visual parameters of the product-related content, manipulating one of the overlays to match the product-related content; and generating a modified version of one or more segments of the plurality of segments of the media content item that have the product-related content by inserting the manipulated overlay into the product-related content.

10. The method of claim 1, wherein the overlay comprises a modification of one or more audio or visual parameters of a portion of the product-related content.

11. A system comprising:

memory; and control circuitry configured to:

generate an endorsement profile for a media content item based on media content item metadata, the endorsement profile comprising data identifying a plurality of segments of the media content item that have product-related content and data identifying, for each of the identified plurality of segments, whether an overlay for the corresponding product-related content is below an effectiveness threshold, wherein the effectiveness threshold is based on at least one of a duration of the product-related content, a size of a product in the product-related content, an angle of the product in the product-related content, or a position of the product in the product-related content;

generate a manifest file comprising instructions that, when executed by a processor, cause a user device to request the media content item based at least in part on the plurality of segments identified by the endorsement profile for the media content item; and transmit the manifest file to the user device.

12. The system of claim 11, wherein, when generating the endorsement profile, control circuitry is configured to:

in response to determining that the overlay for the product-related content is not below the effectiveness threshold, tag a segment of the media content item having the product-related content as having an actionable overlay.

13. The system of claim 11, wherein, when generating the endorsement profile, control circuitry is configured to:

in response to determining that the overlay for the product-related content is below the effectiveness threshold, include in the manifest file a request for a default version of one or more segments of the media content item that do not have the product-related content.

14. The system of claim 11, wherein, when generating the endorsement profile, control circuitry is configured to:

determine whether there is an endorsement restriction for a segment of the media content item having the product-related content; and in response to determining there is not an endorsement restriction for the segment of the media content item having the product-related content, tag the segment of the media content item having the product-related content as having an actionable overlay.

15. The system of claim 11, wherein the endorsement restriction comprises a limiting condition that restricts how or if the product-related content can be replaced or modified.

16. The system of claim 11, wherein the control circuitry is configured to:
   update the media content item metadata based on the generated endorsement profile.

17. The system of claim 11, wherein the manifest file for the media content item comprises instructions requesting a modified version of one or more segments of the media content item having the product-related content, and a default version of one or more segments of the plurality of segments of the media content item not having the product-related content, wherein the control circuitry is configured to:
   compile a playlist comprising the modified version of one or more segments of the media content item and the default version of one or more segments of the media content item.

18. The system of claim 11, the system further comprising:
   request multiple overlays for the product-related content;
   determine whether one or more audio and/or visual parameters of one of the overlays matches one or more audio and/or visual parameters of the product-related content; and
   in response to determining that the one or more audio and/or visual parameters of one of the overlays matches the one or more audio and/or visual parameters of the product-related content, generate a modified version of one or more segments of the plurality of segments of the media content item that have the product-related content by inserting the overlay into the product-related content.

19. The system of claim 18, wherein the control circuitry is configured to:
   in response to determining that the one or more audio and/or visual parameters of each of the overlays do not match the one or more audio and/or visual parameters of the product-related content, manipulate one of the overlays to match the product-related content; and
   generate a modified version of one or more segments of the plurality of segments of the media content item that have the product-related content by inserting the manipulated overlay into the product-related content.

20. The system of claim 11, wherein the overlay comprises a modification of one or more audio or visual parameters of a portion of the product-related content.

* * * * *